United States Patent
Trussell, Jr. et al.

(10) Patent No.: US 6,904,074 B2
(45) Date of Patent: Jun. 7, 2005

(54) DIODE-PUMPED MICROLASER

(75) Inventors: C. Ward Trussell, Jr., Woodbridge, VA (US); Vernon King, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/389,759

(22) Filed: Mar. 18, 2003

(65) Prior Publication Data

US 2004/0184505 A1 Sep. 23, 2004

(51) Int. Cl.[7] .......................... H01S 3/091; H01S 3/09
(52) U.S. Cl. .......................................... 372/75; 372/69
(58) Field of Search ..................................... 372/69–75

(56) References Cited

U.S. PATENT DOCUMENTS

| | | | |
|---|---|---|---|
| 5,038,353 A | * 8/1991 | Esterowitz et al. | 372/41 |
| 5,289,482 A | * 2/1994 | Esterowitz et al. | 372/41 |
| 5,513,201 A | * 4/1996 | Yamaguchi et al. | 372/75 |
| 5,644,589 A | * 7/1997 | Anthon | 372/92 |
| 5,790,574 A | * 8/1998 | Rieger et al. | 372/25 |
| 6,044,096 A | * 3/2000 | Wolak et al. | 372/36 |
| 6,628,692 B2 | * 9/2003 | Kasamatsu | 372/70 |
| 6,778,563 B2 | * 8/2004 | Pasiskevicius et al. | 372/11 |
| 2002/0181513 A1 | * 12/2002 | Laurell et al. | 372/11 |
| 2002/0191664 A1 | * 12/2002 | Trussell, Jr. | 372/71 |

* cited by examiner

*Primary Examiner*—Minsun Harvey
*Assistant Examiner*—Phillip Nguyen
(74) *Attorney, Agent, or Firm*—Arthur K. Samora; William H. Anderson

(57) ABSTRACT

A diode-pumped microlaser in accordance with the present invention includes a diode pump, a first lens, a second lens and a laser glass. The diode pump generates an input pump beam. The first lens and second lens manipulate the pump beam by collimating the pump beam in focal planes that are perpendicular to each other. The laser glass receives the manipulated pump beam from the second lens and converts the pump beam into a laser beam. The laser glass is further doped with predetermined amounts by weight of Erbium and Ytterbium to ensure that an output laser beam with an eyesafe wavelength is generated. The microlaser further includes a passive Q-switch made of a Cobalt-spinel material, which receives the output laser beam and generates laser pulses using passive switching techniques, independent of any external temperature control. This configuration allows the microlaser to function as a laser rangefinder over extended temperature ranges in a manner that is eyesafe to the user.

7 Claims, 3 Drawing Sheets

DIODE-PUMPED MICROLASER

FIELD OF THE INVENTION

The present invention applies to devices for generating laser beams. More particularly, the present invention applies to laser generators that produce pulsed laser beams. The present invention is particularly, but not exclusively, useful as a miniature device that manipulates an input pump beam to yield a laser beam with greatly increased output power relative to similarly-sized devices with input pump beams of similar power.

BACKGROUND OF THE INVENTION

The use of laser devices for rangefinding purposes is well known in the prior art. To be effective, these devices should have certain desirable qualities. Specifically, these devices should be small, lightweight, easy to manufacture. Additionally, the devices should produce a pulsed laser beam that has good output power and a high pulse repetition rate for increased range capability. Superimposed over these requirements are eye safety considerations, which require that the device generate and transmit a laser with a wavelength of over 1.4 microns ($\lambda > 1.4$ $\mu$m).

Previous laser transmitters used in rangefinding have had some, but not all, of these characteristics. For example, some flashlamp-pumped solid-state laser devices have been used to generate a laser beam for rangefinding purposes. However, although solid-state lasers effectively generate a single laser pulse, they are not capable of a multiple-pulsed laser beam without adding cumbersome cooling systems, which increases the size and power requirements of the laser transmitter.

Diode-pumped solid-state lasers lead to more efficient operation and therefore can be smaller and lightweight. Neodymium:Yttrium-Aluminum garnet (Nd:YAG) lasers are now commercially available for producing a pulsed laser beam for rangefinding purposes. The devices, however, produce a laser beam with a wavelength of approximately 1.0 micron ($\lambda \sim 1.0$ $\mu$m), which is not considered eyesafe at the increased output power required for certain rangefinding applications (over one kilometer). Additionally, diode-pumped solid-state lasers often do not operate over a wide range of environmental temperatures without incorporating inefficient and cumbersome temperature controls into the device.

The paper "1.55 $\mu$m Passive Q-switched Microchip Laser", written by Ph. Thony, et al. and presented in Optical Society of America, Vol. 19, pp. 150–154, discloses diode pumped Erbium:Ytterbium micro-chip lasers which are small and yet are capable of producing a pulsed laser beam at an eyesafe wavelength ($\lambda \sim 1.55$ $\mu$m) by using passive Q-switching. However, these devices cannot produce a pulsed laser beam with sufficient pulsed power for rangefinding at over one kilometer.

In light of the above, it is an object of the present invention to provide a diode-pumped microlaser that can be used for rangefinding purposes. It is another object of the present invention to provide a diode-pumped microlaser which provides an output pulsed laser beam with a wavelength which is eyesafe to the operator. Yet another object of the present invention is to provide a diode-pumped microlaser that can be operated over a wide temperature range without requiring temperature control components. Another object of the present invention is to provide a diode-pumped laser transmitter that generates a pulsed laser beam with a high pulse repetition rate for rangefinding at extended ranges. Another object of the present invention is to provide a diode-pumped microlaser, which is lightweight and battery-operated. Yet another object of the present invention is to design a microlaser which is easy to use and is comparatively cost-effective to manufacture.

SUMMARY OF THE INVENTION

A microlaser in accordance with the present invention includes a diode pump for generating a pump beam, a first lens and a second lens for manipulating the pump beam, and a laser glass for converting the manipulated pump beam into a laser beam with greatly increased output power. The first lens is preferably cylindrical in shape and is positioned proximate the diode pump to receive the pump beam. The first lens efficiently collects and collimates the received pump beam in a horizontal first plane to yield an intermediate pump beam.

The second lens is also somewhat cylindrical in shape and is oriented so that the longitudinal axis of the second lens is oriented about perpendicular to the longitudinal axis of the cylindrical first lens. The first lens is further positioned between the diode pump and the second lens. With this configuration, the second lens receives the intermediate pump beam, which has been collimated in a first plane. The second lens re-collimates the intermediate beam in a second plane that is perpendicular to the first plane. The net result is an extremely intense input pump beam.

After leaving the second lens, the input pump beam is received by the laser glass and converted to a laser beam therein. In order to generate a laser beam of at least 1.4 $\mu$m ($\lambda > 1.4$ $\mu$m), the laser glass is doped with Erbium and Ytterbium materials. Preferably, the laser glass includes between one and three percent by weight (1–3%) Erbium material and between fifteen and twenty-five percent by weight (15–25%) Ytterbium material. The length of the laser glass is chosen according to the doping level (percentage) of Ytterbium in the laser glass, and the manipulation of the input pump beam discussed above causes the input pump beam to be collimated along the entire length of the laser glass.

To pulse the laser beam, the diode-pumped microlaser of the present invention includes a passive Q-switch. The Q-switch is located on the output side of the laser glass, so that laser glass is positioned between the second lens and the Q-switch. The Q-switch receives the laser beam from the laser glass and absorbs the beam until it becomes saturated with laser energy. The saturated Q-switch then becomes transparent to the laser beam and allows the laser to emit a series of discrete pulses. Preferably, the Q-switch is made of a Cobalt-spinel material, although other materials are envisioned for the Q-switch without departing from the scope of the present invention.

BRIEF DESCRIPTION OF THE DRAWINGS

The novel features of this invention will be best understood from the accompanying drawings, taken in conjunction with the accompanying description, in which similar characters refer to similar parts, and in which.

WRITTEN DESCRIPTION OF THE PREFERRED EMBODIMENT

Figure 1:
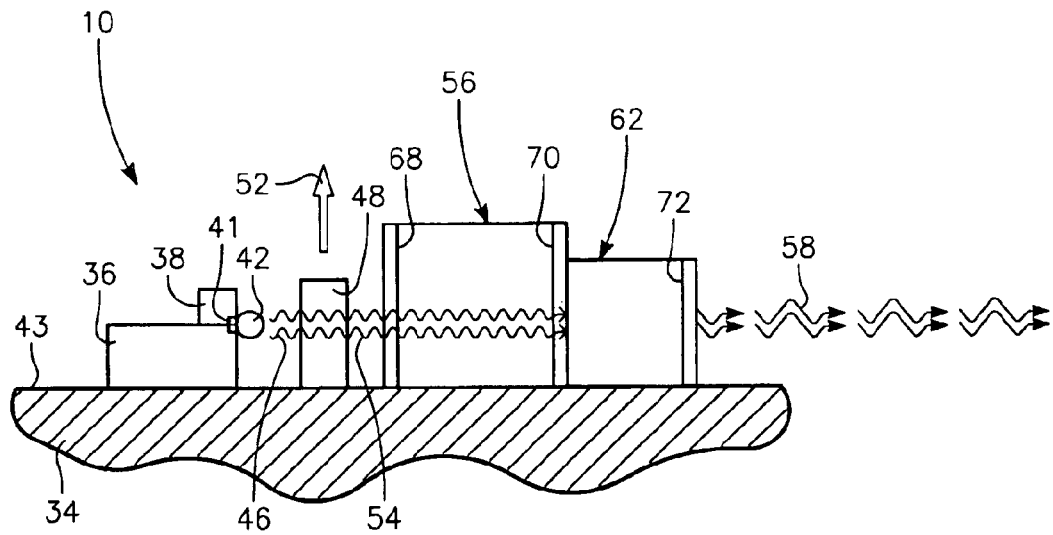
FIG. 1 is a side elevational view of the microlaser of the present invention.

In brief overview, and referring now to the Figures, the microlaser of the present invention is shown and is generally designated by reference character 10. As shown in the Figures, the microlaser of the present invention includes a pump diode 38 and a fast axis lens 42. The fast axis lens is preferably cylindrically shaped and is attached to an optical mount (The optical mount is only partially shown in FIG. 1, please see FIGS. 4–6 to see the optical mount in its entirety) so that it is immediately proximate the pump diode. Once attached, the fast axis lens 42 is longitudinally centered on a fast axis 44 (FIG. 2) that is parallel to horizontal surface 43 of optical mount 34. By cross-referencing FIGS. 1 and 2, it can be seen that cylindrical fast axis lens receives an incident initial pump beam 41. The cylindrical fast axis lens collimates the lights rays of initial pump beam 41 in a horizontal plane that is parallel with horizontal surface 43 and coincident with fast axis 44 (fast axis 44 is shown in FIG. 6). The result is an intermediate pump beam 46 of increased output power. The intermediate pump beam 46 is depicted in FIGS. 1 and 2.

Figure 2:
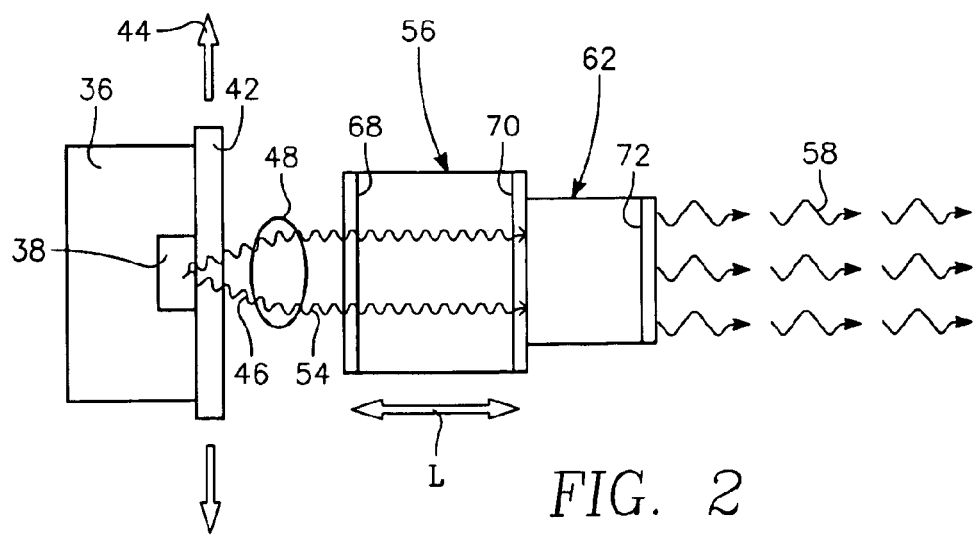
FIG. 2 is a top plan view of the microlaser shown in FIG. 1.
Figure 4:
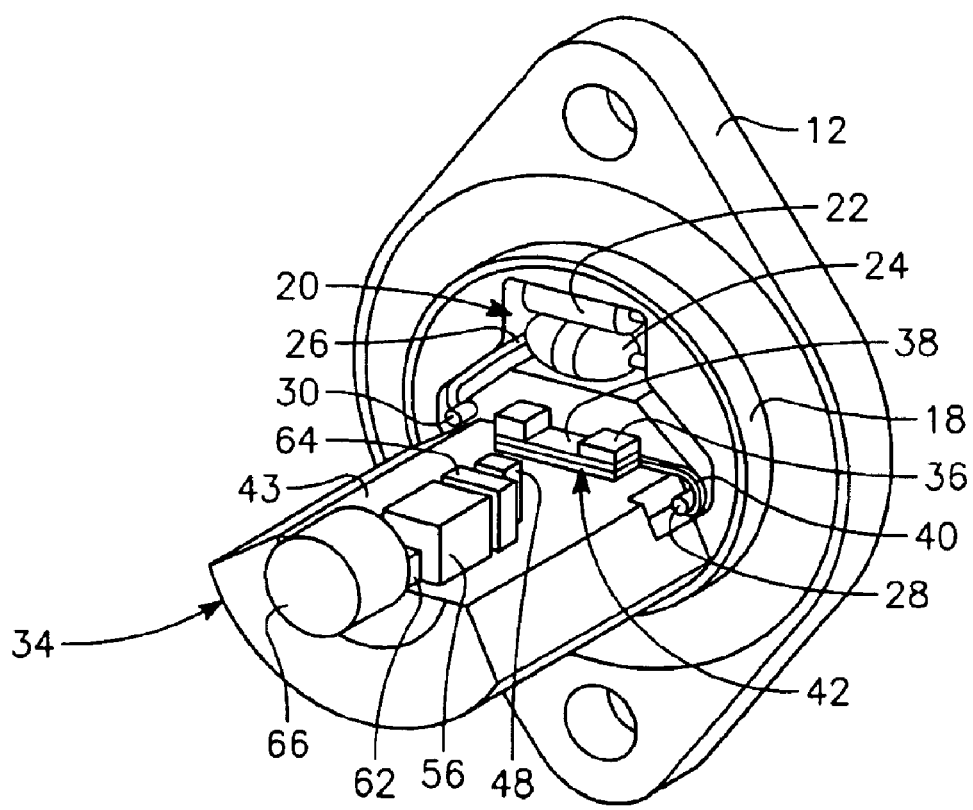
FIG. 4 is an enlarged isometric view of the device of FIG. 3, with the cover removed to illustrate the internal components of the microlaser.
Figure 5:
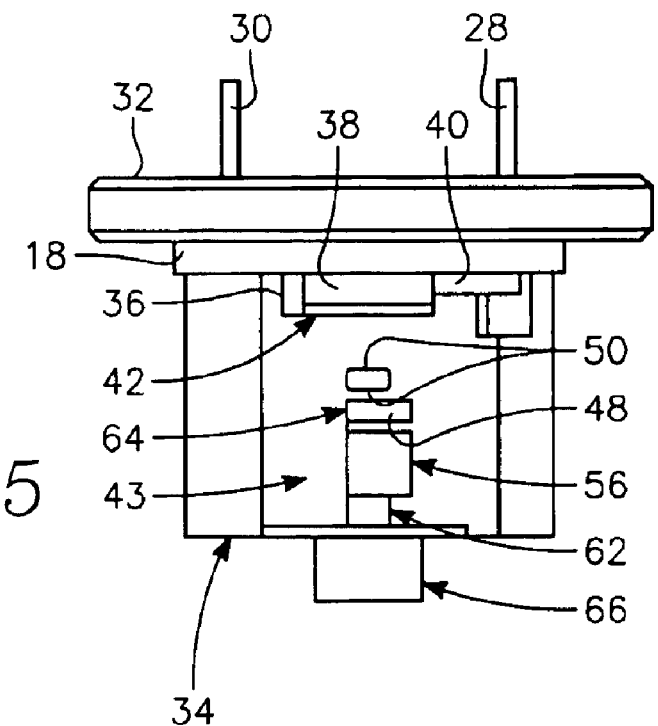
FIG. 5 is a top plan view of the device of FIG. 4.
Figure 6:
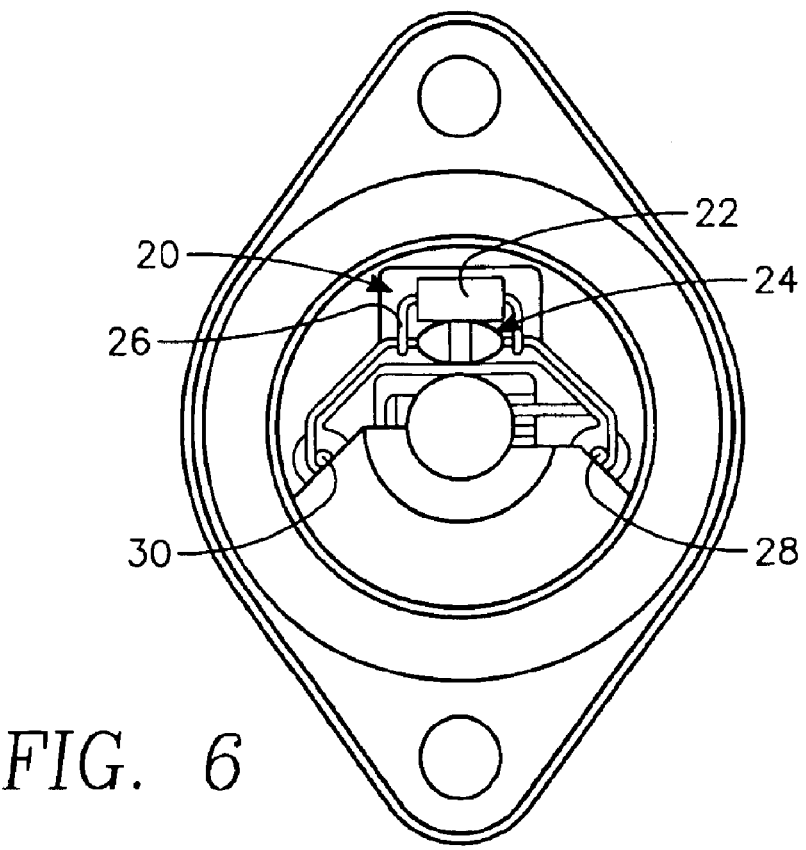
FIG. 6 is a front elevational view of the device of FIG. 4.

The microlaser of the present invention further includes a slow axis lens 48 that is attached to optical mount 34 as shown in FIGS. 1, 4 and 5. The slow axis lens includes opposing convex surfaces 50, 50 and is longitudinally centered on a slow axis 52 that is vertical, as depicted in FIG. 1. The slow axis lens receives the incident intermediate pump beam 46 and re-collimates the intermediate pump beam in a slow plane that is coincident with the slow axis 52 and orthogonal to the plane containing the fast axis 44. Stated differently, the fast axis lens and slow axis lens cooperate to provide an input pump beam 54 of greatly increased output power by collimating light rays from the initial pump beam from pump diode 38 in respective planes which are orthogonal to each other.

The microlaser of the present invention includes a glass filter 64 that is attached to the optical mount 34 so that it is located on the opposing side of slow axis lens 48 from fast axis lens 42. The glass filter transmits the pumplight but prevents pulsed 1.53 μm light from being transmitted back to the pump laser diode and causing damage to the pump diode.

After passing through the glass filter, the microlaser of the present invention further includes a laser glass 56 that is attached to optical mount 34 to place glass filter 64 between slow axis lens 48 and laser glass 56. The laser glass converts the input pump beam 54 into an output laser beam 58. To do this, the laser glass is doped with Erbium and Ytterbium materials.

To ensure that the output laser beam has a wavelength of greater than 1.5 microns ($\lambda$>1.5 μm), the laser glass is doped with between one to three percent Erbium (1–3%) by weight, and between fifteen and twenty-five percent Ytterbium (15–25%) by weight. As shown in FIG. 2, the laser glass has a length L that is selected according to the percentage by weight of Ytterbium that is incorporated into the laser glass. This ensures collimation of the pump beam within the laser glass, while also minimizing absorbance losses within the laser glass. The laser glass also includes a first dichroic coating 68, which transmits the input pump beam wavelength (~0.94 microns) but reflects the lasing wavelength (~1.54 microns). A second dichroic coating 70, which is placed on the output surface of the laser glass, reflects the input pump beam but allows for passage (transmission) of the lasing wavelength.

To generate a pulsed output laser beam, the microlaser of the present invention includes a Q-switch 62 that is fixed to the optical mount 34 and positioned so that laser glass 56 is between the Q-switch and glass filter 64. The Q-switch is made of a Cobalt:spinel material, which further allows the switch to absorb predetermined amounts of laser energy. Once absorbed, the Q-switch quickly discharges that energy in a series of short bursts to thereby pulse the laser beam output. Stated differently, the Q-switch uses a passive switching technique to pulse the laser beam output.

Preferably the Q-switch includes an partially reflecting coating 72 which acts as an output coupler for the laser cavity to thereby allow passage of the output laser beam 58 from the Q-switch in short pulses as described above (See FIGS. 1 and 2). Alternatively, the microlaser further can include a separate output coupler 66 (See FIGS. 4–6) that is affixed to the optical mount proximate the output side of the passive Q-switch 62 so that passive Q-switch is positioned between laser glass 56 and coupler 66.

Figure 3:
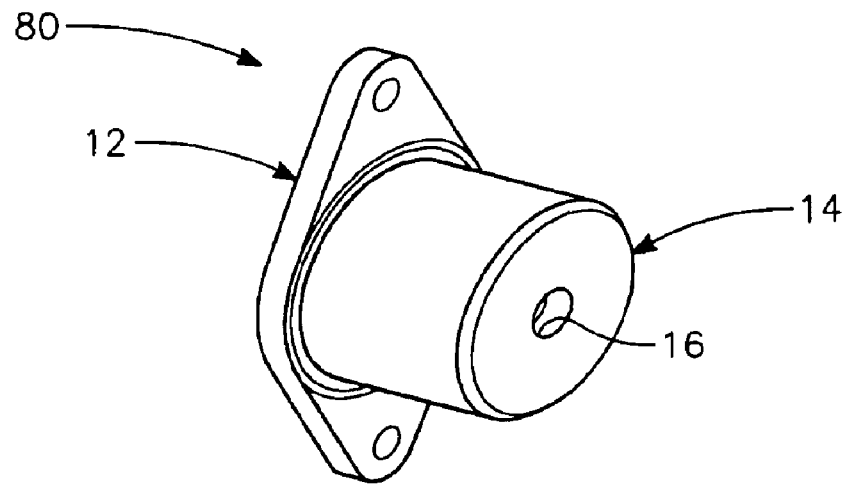
FIG. 3 is an isometric view of the microlaser of the present invention, which shows the microlaser incorporated within an operational environment as part of a laser rangefinder.

Referring now primarily to FIGS. 3–6, the microlaser device of the present invention is shown in an operational environment as part of laser rangefinder 80. As shown in FIG. 3, the rangefinder 80 comprises a plate 12 and a cover 14 that is mounted to the plate and extends therefrom. The cover and plate form a protective covering for the internal components of the device. A window 16 that is formed in the cover allows for passage of the laser beam through the cover. The manner in which the laser beam is generated for passage therethrough is more fully described below.

As perhaps best seen in FIGS. 4 and 6, a pedestal 18 extends outwardly from one side of the plate. The pedestal is formed with a recess 20, and a resistor 22 and a capacitor 24 are placed in the recess, as best seen in FIGS. 2 and 4. The resistor and capacitor are electrically connected via wiring 26 to a cathode pin 28 and an anode pin 30. The cathode pin 28 and anode pin 30 are both attached to the plate so that they extend through the plate thickness. The pins 28, 30 extend into recess 20 and outwardly from back surface 32 of plate 12 (See FIG. 5).

The aforementioned optical mount 34 is attached to the pedestal so that it extends perpendicularly outward therefrom. A diode block 36 is attached to the optical mount and pedestal so that it contacts both the optical mount and the pedestal, as perhaps best seen in FIG. 4. A pump diode 38 is fixed to the diode block. The pump diode is electrically connected to pins 28, 30 via a diode lead 40 that contacts pin 28 on one end and pump diode 38 on the other end.

When a direct current (DC) voltage potential is placed across pins 28, 30, an electrical circuit is established, and the resistor and capacitor cooperate to establish a pulsed DC voltage input to the pump diode. The pump diode converts the pulsed DC voltage input into an initial pump beam 41 (shown in FIG. 1) in a manner known in the prior art. The values of the resistor and capacitor can be varied to establish desired pulse length and pulse repetition rate of the DC input. Further, varying the input DC voltage parameters allows the operator to choose the pulse parameters of the initial pump beam (and resulting laser beam) according to the needs of the operator.

During operation of the device, the operator energizes the device by providing an input direct current (DC) voltage potential across pins 28, 30. The DC voltage is transmitted to resistor and capacitor 22, 24, which cooperate as mentioned above to send a pulsed DC voltage input to pump diode 38. The pump diode, in response to the DC voltage input, generates a pulsed initial pump beam 41 that is received by fast axis lens 42 and collimated in a first plane to yield intermediate pump beam 46. The intermediate pump beam is received by the slow axis lens and collimated in a second plane orthogonal to the first plane to yield input pump beam 54.

After passing through glass filter 64, the input pump beam 54 is received by laser glass 56 and converted into output laser beam 58. The output laser beam is received by passive Q-switch 62 and converted into discrete laser beam pulses. The laser beam pulses pass through coupler 66 and exit window 16 of cover 14 to thereby transmit a pulsed laser beam from microlaser 10.

While the microlaser, as herein shown and disclosed in detail, is fully capable of obtaining the objects and providing the advantages above stated, it is to be understood that the presently preferred embodiments are merely illustrative of the invention. As such, no limitations are intended other than as defined in the appended claims.

What is claimed is:

1. A laser device comprising:
    a diode pump for generating a pump beam;
    a laser glass for receiving said pump beam for further conversion into a laser beam;
    a first cylindrical lens positioned between said diode pump and said laser glass for collimating said pump beam in a first plane;
    a second cylindrical lens positioned perpendicular to said first cylindrical lens and between said first lens and said laser glass for collimating said pump beam in a second plane substantially perpendicular to said first plane; and,
    a passive Q-switch made of a Cobalt-spinel material and positioned immediately proximate said laser glass for receiving said laser beam from said laser glass.

2. The device of claim 1 wherein said first lens defines a first longitudinal axis and further wherein said second lens defines a second longitudinal axis perpendicular to said first longitudinal axis.

3. The device of claim 1 further comprising a glass filter located between said second lens and said laser glass.

4. The device of claim 1 wherein said laser glass includes between one and three percent (1–3%) Erbium by weight.

5. The device of claim 4 wherein said laser glass includes between fifteen and twenty-five percent (15–25%) Ytterbium by weight.

6. The device of claim 1 wherein said laser beam has a wavelength of at least 1500 nm.

7. The device of claim 5 wherein said laser glass has a length L according to the percentage Ytterbium by weight incorporated into the laser glass.

* * * * *